United States Patent [19]

Takata

[11] Patent Number: 4,651,072

[45] Date of Patent: Mar. 17, 1987

[54] VARIABLE FREQUENCY POWER SOURCE OPERATING SYSTEM

[75] Inventor: Nobuharu Takata, Hyogo, Japan

[73] Assignee: Mitsubishi Denki Kabushiki Kaisha, Tokyo, Japan

[21] Appl. No.: 698,849

[22] Filed: Feb. 6, 1985

[30] Foreign Application Priority Data

Apr. 2, 1984 [JP] Japan ................................. 59-65424
Apr. 2, 1984 [JP] Japan ................................. 59-65425

[51] Int. Cl.$^4$ ............................................. H02P 5/40
[52] U.S. Cl. ................................. 318/440; 318/806; 318/798; 307/64
[58] Field of Search ............................. 307/64, 85, 86; 318/440, 441, 442, 565, 806, 798; 363/57; 328/120

[56] References Cited

U.S. PATENT DOCUMENTS

| | | | |
|---|---|---|---|
| 3,406,319 | 10/1968 | Faulkes | 318/565 |
| 3,793,573 | 2/1974 | Tsuboi | 318/810 |
| 3,821,630 | 6/1974 | Korneumpf et al. | 363/57 |
| 4,281,276 | 7/1981 | Cutler et al. | 318/803 |

Primary Examiner—David Smith, Jr.
Attorney, Agent, or Firm—Bernard, Rothwell & Brown

[57] ABSTRACT

The output frequency of a variable frequency power source for driving a motor which drives a rotary body such as a fan in a variable-speed control mode is fixed, when abnormality in a control signal supplied to the variable frequency power source from outside to determine the output frequency of the variable frequency power source is detected, at the output frequency of the variable frequency power source immediately before the detection of abnormality in the control signal, and thereby the abnormal variation of the revolving rate of the motor resulting from the abnormality in the control signal is avoided.

6 Claims, 9 Drawing Figures

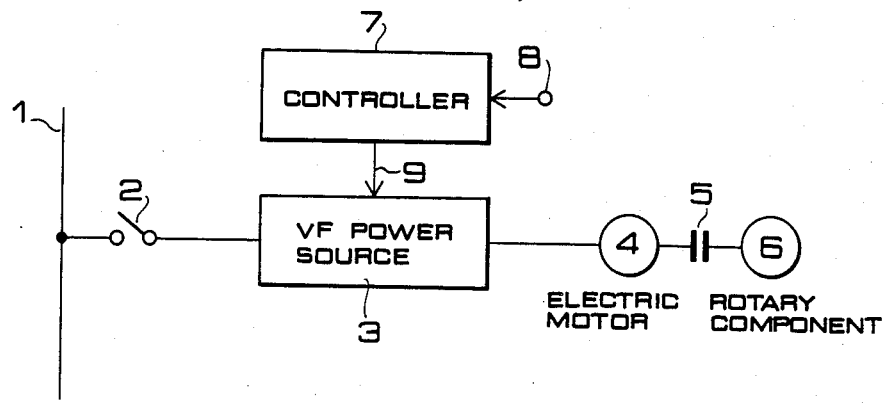
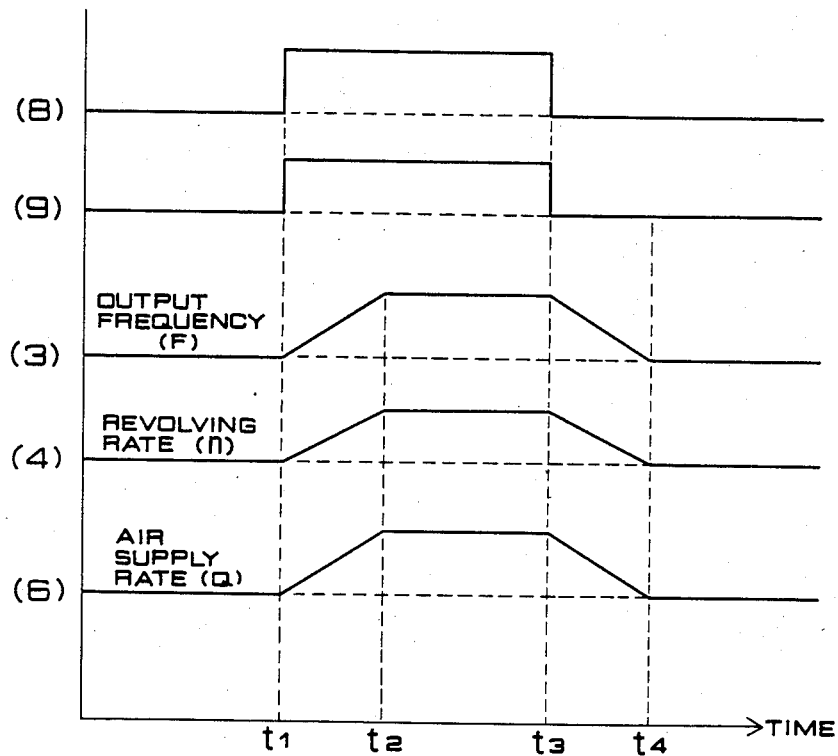

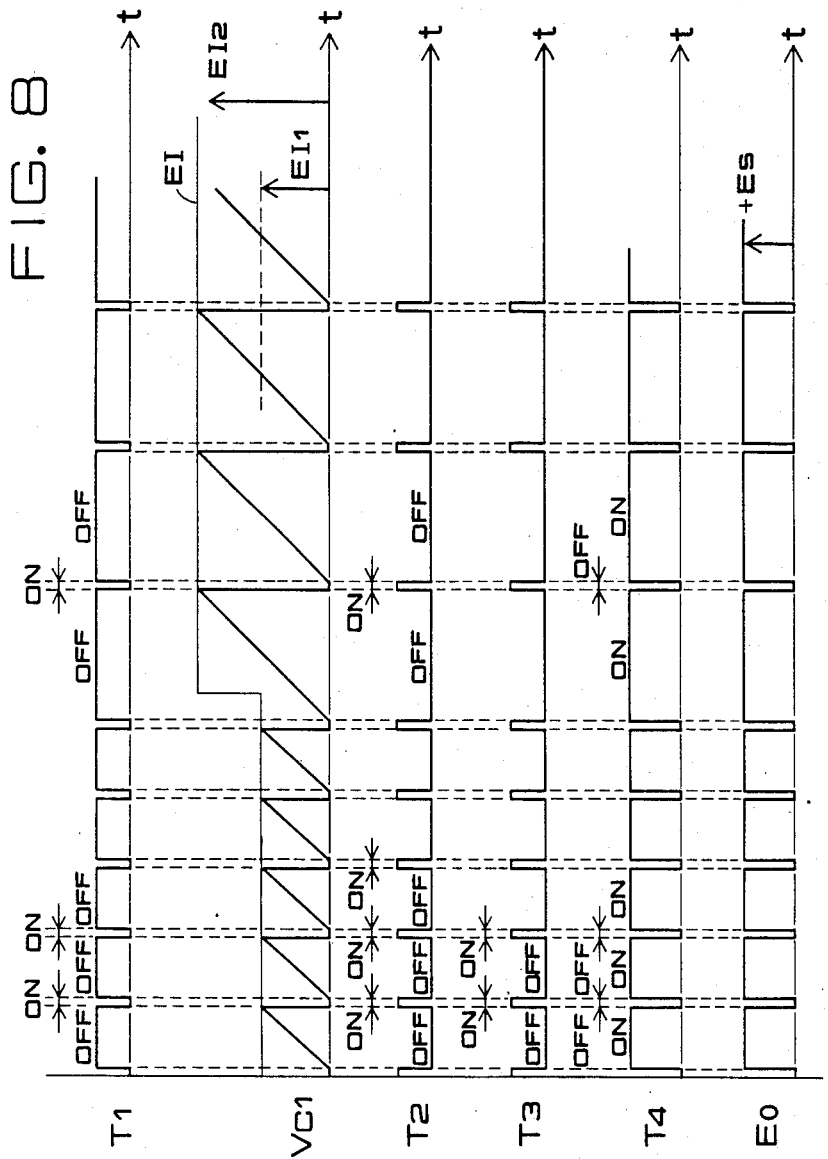

VARIABLE FREQUENCY POWER SOURCE OPERATING SYSTEM

BACKGROUND OF THE INVENTION

1. Field of the Invention

The present invention relates to a system for driving the rotary component of a fan, a pump or the like by supplying power from a variable frequency power source (referred to as "VF power source" hereinafter) and more particularly to a VF power source operating system for operating a VF power source under an abnormal condition in which VF power source control signals can not be sent to the VF power source due to disconnection accident or short-circuit accident in the signal line.

2. Description of the Prior Art

A conventional VF power source operating system of this kind is shown in FIG. 1, in which indicated at 1 is a commercial power line, at 2 is a switch, at 3 is a VF power source for controlling the speed of a motor 4, at 6 is the rotary component of a fan, a pump or the like, at 5 is a mechanical coupler for coupling the motor 4 and the rotary component 6, at 7 is a controller which gives a frequency control signal to the VF power source 3, at 8 is a control command given to the controller 7 and at 9 is a signal line interconnecting the controller 7 and the VF power source 3. In FIGS. 2 and 3, $t_1$ and $t_3$ are a time point when an increase control command is given and a time point when a decrease control command is given respectively, $t_2$ and $t_4$ are time points when the frequency of the output of the VF power source reaches the increased and decreased target frequencies, respectively, $t_5$ is a time point when an accident occurred in the signal line 9 and $t_6$ is a time point when the frequency of the output of the VF power source 3 reaches the frequency corresponding to the absence of the signal on line 9.

The functions of this conventional VF power source operating system will be described hereinafter. In order to give a concrete description, the rotary component 6 is regarded as a fan for supplying its output (air) to the boiler, not shown, of a power plant.

Referring to FIG. 1, the VF power source 3 receives power through the switch 3 from commercial power line 1 and provides an output for driving the motor 4. The revolving rate n of the motor 4 is represented by the following expression:

$$n = (120 \times F)/P \qquad (1)$$

where F is the frequency of the output power of the power source and P is the number of poles of the motor.

Accordingly, the revolving rate n is proportional to the frequency F of the output power of the power source, that is, the revolving rate n of the motor 4 varies according to the variation of the output frequency F of the VF power source 3.

The motor 4 is coupled with the fan 6 with a coupler 5 and the fan 6 supplies air to the boiler at an output air supply rate Q which is approximately proportional to the revolving rate n of the motor 4.

In a power plant, the air demand of the boiler changes as the power demand of the associated power grid changes or the fuel supply mode of the boiler changes. In such a case, a control command 8 to change the air supply rate is given to the controller 7 and a control signal for deciding the air supply rate Q is given through the signal line 9 to the VF power source 3, and then the VF power source 3 provides an output of a frequency F corresponding to the required air supply rate Q.

FIG. 2 is a time chart for explaining the normal actions of the conventional VF power source system shown in FIG. 1. In FIG. 2, when the control command 8 requests the increase of the air supply rate Q at a time point $t_1$ and the decrease of the increase air supply rate to the original air supply rate at a time point $t_3$, the output of the controller 7 is given through the signal line 9 to the VF power source 3. Ordinarily, the VF power source 3 is designed to respond to the request for the change of the output at a fixed increase rate or a fixed decrease rate, therefore the change of the output frequency F of the VF power source 3 is delayed slightly from the time points $t_1$ and $t_3$ of request for the change and the output frequency changing action of the VF power source 3 is completed at the time points $t_2$ and $t_4$. That is, if it is desired to change the output air supply rate Q of the fan 6, the revolving rate n of the motor 4 is changed by changing the output frequency F of the VF power source 3.

FIG. 3 is a time chart showing the changes of controlled factors in case the disconnection of the signal line 9 including the loosening or the falling off of the connecting terminal, by way of example, has occurred. In this case, naturally, there is no change in the control command 8 and the control command 8 is requesting a fixed air supply rate Q. When the disconnection of the signal line 9 occurred at a time point $t_5$, the input signal of the VF power source 3 becomes zero. Consequently, as explained in connection with FIG. 2, the output frequency F of the VF power source decreases with a slight delay to a lower limit value causing the decrease of the revolving rate n of the motor 4, and thereby the output air supply rate Q is decreased.

Since the operation of a motor by means of a conventional VF power source has been performed in the manner as described hereinbefore, the output frequency of the VF power source 3 varies unnecessarily in case an accident occurs in the control signal to be given to the VF power source 3, which entails unstable operation of the motor 4 and the rotary component 6 and the resulting accident in the system.

SUMMARY OF THE INVENTION

Accordingly, it is an object of the present invention to provide a variable frequency power source operating system capable of operating the associated variable frequency power source so that the sudden and great change of the revolving rate of the motor driven by the output of the variable frequency power source is obviated in case an abnormality occurred in the control signal for deciding the output frequency of the variable frequency power source.

In an embodiment of the present invention, when an abnormality in the control signal for deciding the output frequency of a variable frequency power source is detected, the output frequency of the variable frequency power source is fixed to the frequency of the output which had been given immediately before the abnormality was detected. In another embodiment of the present invention, upon the detection of an abnormality in the control signal, the motor is disconnected from the variable frequency power source and connected to a commercial AC power source. In either one of these embodiments, the variation of the revolving rate of the motor is controlled within a limited range.

In changing over the connection of the motor to the variable frequency power source to the connection to a commercial AC power source, the variable frequency power source is controlled from a time immediately after the detection of the abnormality so that the frequency of the variable frequency power source changes gradually to the same frequency as that of the commercial AC power source, if the output frequency of the variable frequency power source is greatly different from that of the commercial AC power source, and the changeover of the power source from the variable frequency power source to the commercial AC power source is executed upon the coincidence of the output frequency of the variable frequency power source with that of the commercial AC power source.

Other objects, features and advantages of the present invention will become apparent from the description of the preferred embodiments thereof taken in connection with the accompanying drawings.

BRIEF DESCRIPTION OF THE DRAWINGS

FIG. 1 is a block diagram of a conventional VF power source operating system;

FIG. 2 is a graph showing the relation between a control signal given by the VF power source operating system of FIG. 1 and the change of air supply rate Q;

FIG. 8 is a waveform chart showing the waveforms of signals provided by the control signal generating circuit of FIG. 5.

DETAILED DESCRIPTION OF THE PREFERRED EMBODIMENTS

Figure 3:
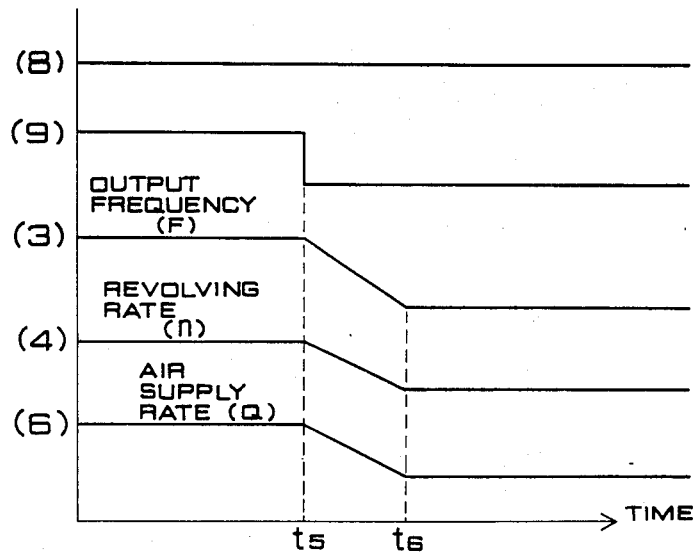
FIG. 3 is a graph similar to FIG. 2, where an abnormal control signal is provided.
Figure 4:
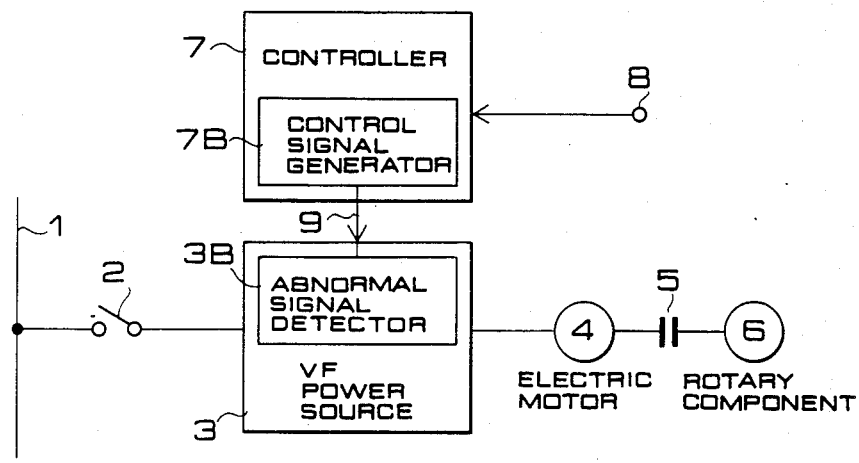
FIG. 4 is a block diagram of a VF power source operating system, in a preferred embodiment, according to the present invention.

VF power source operating systems according to the present invention will be described hereinafter in connection with the accompanying drawings. In FIG. 4, the components indicated at reference characters 1 to 9 are substantially the same as those shown in FIG. 1, except that the controller 7 has a control signal generator 7B and the VF power source 3 has an abnormal signal detector 3B.

Figure 5:
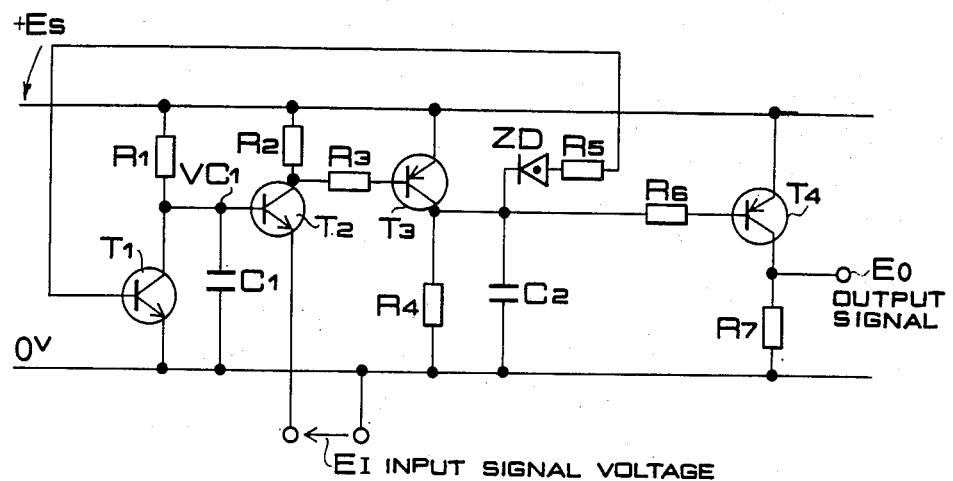
FIG. 5 is a circuit diagram of a control signal generating unit.
Figure 6:
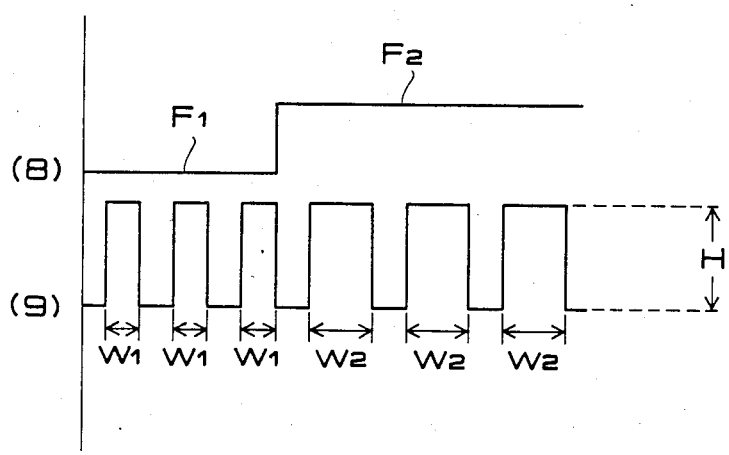
FIG. 6 is a waveform chart showing an input signal and an output signal of the control signal generating unit of FIG. 5.

FIG. 5 shows the circuit of the control signal generator 7B, which will be described in detail afterward. As shown in FIG. 6, basically, the control signal generator 7B generates a control signal in the form of a train of pulses of a pulse width W1 or a pulse width W2 when the level of the control signal 8 is F1 or F2 respectively and supplies the control signal to the abnormal signal detector 3B. In FIG. 5, indicated at $T_1$, $T_2$, $T_3$ and $T_4$ are transistors, at $R_1$ to $R_7$ are resistances, at $C_1$ and $C_2$ are capacitors, at ZD is a Zener diode, at $+E_s$ is the voltage of a DC power source and at $VC_1$ is the terminal voltage of the capacitor $C_1$.

Figure 7:
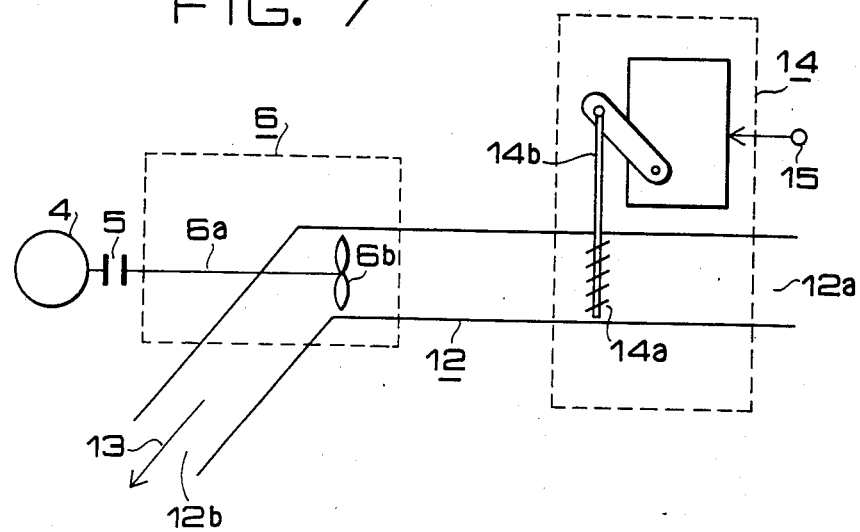
FIG. 7 is a schematic illustration of the blower unit of a boiler to which the present invention is applied.

The VF power source operating system according to the present invention is applied advantageously for controlling the air supply rate of the blower unit of a boiler as shown in FIG. 7, for instance. In this blower unit, the rotary component 6 consists of a shaft 6a coupled with a motor 4 with a mechanical coupler 5 and a fan 6b attached to the shaft 6a. The fan 6b is disposed within an air duct 12 to generate an air current in a direction indicated by the arrow 13. An air flow rate regulating mechanism 14 provided as a subsidiary means to regulate the flow rate of the air in the air duct 12 includes a plurality of vanes 14a disposed within the air duct and a driving device 14b which regulates the vane angle according to an input control signal 15. Indicated at 12a and 12b are the inlet and the outlet of the air duct respectively.

The functions of the VF power source operating system of the present invention will be described hereunder. In FIG. 6, the relation between the pulse width $W_i$ of the pulse wave and the magnitude $F_i$ of the control signal 8 is represented by $$W_i = K \cdot F_i \tag{2}$$

where K is a constant and i is an arbitrary positive integer.

Accordingly, in the case of FIG. 4, $$W_1 = K \cdot F_1 \text{ and } W_2 = K \cdot F_2 \tag{3}$$

The control signal generator for generating pulse signals of pulse widths $W_1$ and $W_2$ is included in the controller 7 shown in FIG. 4. The frequency of an output power of the VF power source 3 for driving the motor 4 is dependent only on the pulse width $W_i$ of the pulse signal as defined by Expression (2).

Referring to FIG. 5, in the control signal generator 7B, voltage $V_c1$ rises at a time constant $C_1R_1$ when the transistor $T_1$ changes from ON state into OFF state. When the voltage $V_c1$ exceeds the input voltage $E_i$, the transistor $T_2$, and the transistor $T_3$, change from OFF states into ON states.

When the transistor $T_3$ is in the ON state, the base current of the transistor T flows through the Zener diode ZD to render transistor $T_1$ conductive to discharge capacitance $C_1$. Upon discharge of capacitance $C_1$, the transistors $T_2$ and $T_3$ return to the OFF state. The capacitor $C_2$ is provided to secure a time period necessary to allow the voltage $V_c1$ to drop to zero volts by discharging the capacitor $C_1$ through the transistor $T_1$.

If the input voltage varies, as shown in FIG. 8, between a level $E_i1$ (a low value) and a level $E_i2$ (a high value), the time for the voltage $V_c1$ to reach the input voltage $E_I$ varies in proportion to the variation in $E_I$. Therefore, the output signal $E_0$ having pulses of pulse widths proportional to the input voltage $E_I$ and of input-frequency relation as shown in FIG. 8 is produced.

If the signal line 9 is disconnected, the pulse magnitude H of the pulse signal being transmitted through the signal line 9 decreases to a reduced magnitude (one of reduced magnitudes including zero) at the input of the VF power source 3 even if any particular change does not occur in the control signal 8. Accordingly, the abnormal signal detector 3B for detecting the deviation of the pulse magnitude H of the pulse signal being supplied through the signal line 9 from the normal magnitude is provided to decide if the signal line 9 is in an abnormal condition, such as disconnection, and to prevent the change of the output signal of the VF power source 3 so that the existing operating condition of the motor is maintained.

Although the invention has been described as applied to controlling the revolving rate of the fan of a power plant, the present invention is applicable for the same effects also to controlling a rotary component other than a fan, such as a pump, or as a VF power source operating system of a system other than a power plant.

In the description given hereinbefore, the functions of the embodiment of the present invention have been described with reference to an abnormal condition where the signal line 9 was disconnected; however, the abnormal condition is not limited thereto and may be an accident such as short-circuit other than disconnection of the line 9.

In FIG. 6, the minimum pulse magnitude and the maximum pulse magnitude of the pulse signal are zero and H respectively by way of example; however, the reference pulse magnitude is not necessarily limited to zero.

Furthermore, in the description given above, the frequency control input applied to the VF power source 3 is a pulse signal of variable pulse width; however, a numerical signal produced through digital coding may be used instead of the pulse signal.

Figure 9:
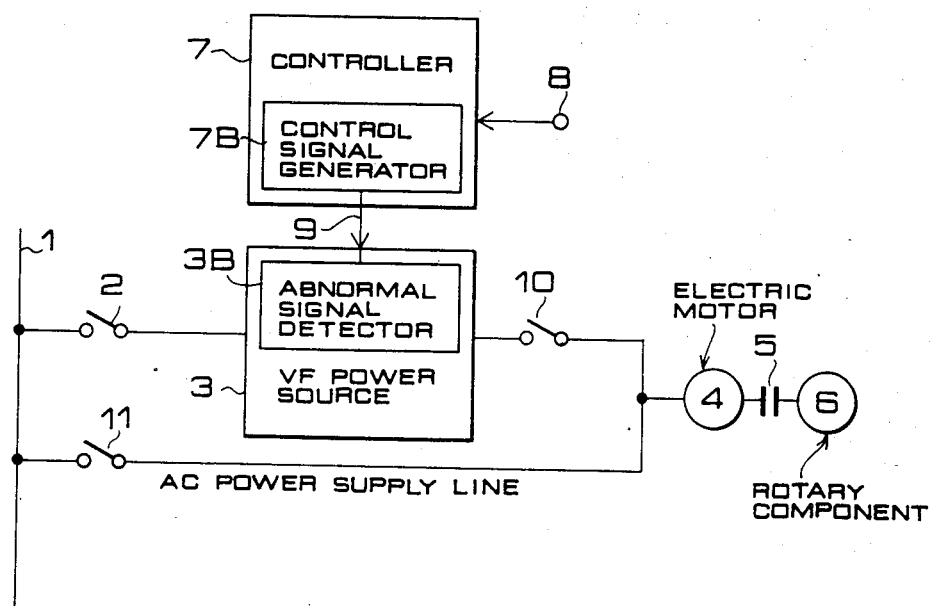
FIG. 9 is a block diagram of a VF power source operating system, in another embodiment, according to the present invention.

FIG. 9 shows another embodiment of the present invention. This embodiment is different from the embodiment shown in FIG. 4 in respect of the insertion of switch 10 between a VF power source 3 and a motor 4 and the provision of an AC power supply line having a switch 11 for connecting the motor 4 to a commercial power supply. This embodiment changes over the power source of the motor 4 from the VF power source 3 to the commercial power supply when the abnormal signal detector 3B detects an abnormality in the control signal. This power source changeover action is performed preferably in cooperation with an air supply rate control mechanism 14 shown in FIG. 7.

When an abnormality in the control signal is detected while the system is operating with the vanes 14a of the air supply rate control mechanism 14 fixed at the full open position for the purpose of energy conservation, the abnormal signal detector 3B cancels the fixation of the vanes 14a and changes the control mode of the air supply rate control mechanism 14 into an automatic control mode so that the degree of opening of the vanes 14a is regulated through a driving rod 14b according to an input control signal 15. Simultaneously, the abnormal signal detector 3B raises the output of the VF power source 3 near to the rated value thereof and increases the output frequency F to make the revolving rate of the motor 4 approach the rated revolving rate. The output of the VF power source 3 is raised slowly and gradually. As the revolving rate of the motor 4 is raised, the resulting increase in the air supply rate is restricted within a safe range by reducing the degree of opening of the vanes 14a accordingly. After the output of the VF power source 3 has thus been increased near to the rated output, the switch 2 of FIG. 9 is opened and the switch 11 of FIG. 9 is closed to disconnect the motor 4 from the VF power source 3 and to connect the motor to the commercial power supply 1.

This control procedure performed by this embodiment prevents the sudden change of the frequency of the input power supplied to the motor 4 over a wide range which occurs when the power source of the motor 4 is changed over simply from the VF power source 3 to the commercial power supply 1 immediately after the abnormality in the signal line 9 has been detected, and thereby the variation of the air supply rate in changing the power source is limited within a small extent.

Thus the power source of the motor 4 is changed over safely from the VF power source 3 to the commercial power supply 1 to continue the operation of the system even if any abnormality occurs in the signal line 9.

Although the second embodiment of the present invention has been described as applied to controlling the revolving rate of the fan of a power plant, the present invention is applicable for the same effects also to controlling a rotary component other than a fan, such as a pump, or to a VF power source operating system of a system other than a power plant.

The second embodiment of the present invention has been described in terms of functions in case of the disconnection of the signal line 9 by way of example, however, the abnormal condition is not limited thereto and may be an accident such as short-circuit.

In FIG. 6, the minimum pulse magnitude and the maximum pulse magnitude of the pulse signal are zero and H respectively by way of example; however, the reference pulse magnitude is not necessarily limited to zero.

Furthermore, in the action of the second embodiment, the power source of the motor is changed over from the VF power source 3 to the commercial power supply 1 after the output frequency of the VF power source has been raised near to the rated output frequency thereof; however, it is obvious that the process of changing the power source of the motor is not limited thereto and may be another process in which the power source is changed over immediately after the detection of an abnormal signal by the abnormal signal detector.

Still further, in the description of this embodiment given above, the frequency control input applied to the VF power source 3 is a pulse signal of variable pulse width; however, a numerical signal produced through digital coding may be used instead of the pulse signal.

What is claimed is:

1. In a variable frequency power source operating device provided with a controller which supplies a control signal to a variable frequency power source for transmitting power supplied from a commercial power supply to a motor, in order to hold the output frequency of the variable frequency power source at a desired value, a system for operating said variable frequency power source comprising:
   means provided in the controller to supply the control signal in the form of a pulse signal of a frequency corresponding to the output frequency of the variable frequency power source and of a predetermined fixed pulse magnitude to the variable frequency power source; and
   means provided in the variable frequency power source to detect the pulse magnitude of the control signal, to decide that the control signal is abnormal when the detected pulse magnitude is not a pulse magnitude lying within a predetermined range including the fixed pulse magnitude and to fix the output frequency of the variable frequency power source at the output frequency of the variable frequency power source immediately before the detection of the abnormality in the control signal.

2. In a variable frequency power source operating device provided with a controller which supplies a control signal to a variable frequency power source for transmitting power supplied from a commercial power supply to a motor, in order to hold the output frequency of the variable frequency power source at a desired value, a system for operating said variable frequency power source comprising:

means provided in the controller to supply the control signal in the form of a pulse signal of a frequency corresponding to the output frequency of the variable frequency power source and of a predetermined fixed pulse magnitude to the variable frequency power source; and means provided in the variable frequency power source to detect the pulse magnitude of the control signal, to decide that the control signal is abnormal when the detected pulse magnitude is not a pulse magnitude lying within a predetermined range including the fixed pulse magnitude and to disconnect the motor from the variable frequency power source and connect the motor directly to the commercial power supply.

3. A variable frequency power source operating system according to claim 2, wherein the output frequency of the variable frequency power source is changed gradually to the frequency of the commercial power supply upon the detection of abnormality in the control signal, and the motor is disconnected from the variable frequency power source and connected to the commercial power supply when the output frequency of the variable frequency power source approaches the frequency of the commercial power supply.

4. A variable frequency power source controller comprising:

a variable frequency power source for changing the frequency of a commercial AC power supply into a desired frequency to regulate the revolving rate of a motor on the basis of the desired frequency;

a control unit for supplying a pulse signal of a frequency corresponding to a control command for determining the output frequency of the variable frequency power source and of a predetermined fixed pulse magnitude to the variable frequency power source; and an abnormal signal detector incorporated into the variable frequency power source to detect the pulse magnitude of the control signal and to control the output frequency of the variable frequency power source so that the output frequency of the variable frequency power source is not dominated by the frequency of the control signal.

5. A variable frequency power source controller according to claim 4, wherein said abnormal signal detector fixes the output frequency of the variable frequency power source at the output frequency of the variable frequency power source immediately before the detection of the abnormality, after the detection of abnormality in the control signal.

6. A variable frequency power source controller according to claim 4, wherein said abnormal signal detector makes the output frequency of the variable frequency power source approach the frequency of the commercial AC power supply gradually after the detection of abnormality in the control signal, and disconnects the motor from the variable frequency power source and connects the motor to the commercial AC power source upon the coincidence of the output frequency of the variable frequency power source with that of the commercial AC power supply.

* * * * *